United States Patent
Kuo

(10) Patent No.: US 7,263,234 B2
(45) Date of Patent: Aug. 28, 2007

(54) SYSTEM AND METHOD FOR VIDEO ENCODING ACCORDING TO DEGREE OF MACROBLOCK DISTORTION

(75) Inventor: Chih-Hui Kuo, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 827 days.

(21) Appl. No.: 10/704,629

(22) Filed: Nov. 12, 2003

(65) Prior Publication Data

US 2004/0096112 A1 May 20, 2004

(30) Foreign Application Priority Data

Nov. 13, 2002 (TW) ................ 91133304 A

(51) Int. Cl.
G06K 9/36 (2006.01)
G06K 9/46 (2006.01)
(52) U.S. Cl. ............ 382/239; 382/236; 382/275; 375/240.02; 375/240
(58) Field of Classification Search ........... 382/232, 382/239, 236, 245, 246, 250, 251, 252, 253; 375/240, 240.02, 240.06, 240.15, 240.22, 375/254; 341/51; 348/104.1, 407.1, 419; 358/426.02, 426.07, 426.11
See application file for complete search history.

(56) References Cited

U.S. PATENT DOCUMENTS

| | | | | |
|---|---|---|---|---|
| 5,920,359 A | * | 7/1999 | Curley et al. ............ | 348/699 |
| 6,028,896 A | * | 2/2000 | Jang et al. ............ | 375/240.04 |
| 6,760,478 B1 | * | 7/2004 | Adiletta et al. ............ | 382/236 |
| 7,092,441 B1 | * | 8/2006 | Hui et al. ............ | 375/240.03 |
| 2002/0044605 A1 | | 4/2002 | Nakamura ............ | 375/240.04 |
| 2002/0118953 A1 | * | 8/2002 | Kim ............ | 386/70 |
| 2005/0123044 A1 | * | 6/2005 | Katsavounidis et al. ............ | 375/240.12 |

* cited by examiner

Primary Examiner—Matthew C. Bella
Assistant Examiner—Ali Bayat
(74) Attorney, Agent, or Firm—Troxell Law Office, PLLC

(57) ABSTRACT

The invention relates to a video image encoding method for distributing a bit rate to a target macroblock in a digital image while performing video image encoding. Choose a comparison area in the digital image according to the location of the target macroblock in the digital image. The comparison area includes a plurality of macroblocks that have already been distributed the corresponding bit rates. Choose a similar macroblock from the macroblocks of the chosen comparison area according to a Similar Macroblock Choosing (SMC) procedure. Calculate respectively a first video distortion variable and a second video distortion variable according to a Video Distortion Calculation (VDC) process. Determine the bit rate of the target macroblock according to the distributed bit rate of the similar macroblock and the difference between the first and the second video distortion variables.

19 Claims, 5 Drawing Sheets

SYSTEM AND METHOD FOR VIDEO ENCODING ACCORDING TO DEGREE OF MACROBLOCK DISTORTION

BACKGROUND OF THE INVENTION

1. Field of the Invention

The present invention relates to a video image encoding method, and more particularly, a method of encoding according to the degree of macroblock distortion.

2. Description of the Prior Art

A digital video can be looked as a series of static digital image. Under a continuous playing situation, because the sense of the sight temporary stop, can regard as a continuous video. The digital image comprises a plurality of macroblocks. Without compression, the digital video usually needs a lot of storing space and bandwidth.

When compressing a digital video, must distribute a bit budget. The Prior art for every macroblock in the digital image, use a fixed rate to distribute the bit budget. However, under the actual situation, a more complex macroblock needs more bit budget distributing. Less complex macroblock only needs less bit budget distributing. So, using a fixed distributing method can not effectively distribute the bit budget.

Another prior art based on the complex of the macroblock, proceed the bit budget distributing. However, the complex of the macroblock can not respond to the digital image quality. Thus, the method based on the complex of the macroblock distributing, cannot distribute bit budget efficiently yet.

SUMMARY OF THE INVENTION

Accordingly, an objective of the invention is to provide a method for video encoding according to the degree of macroblock distortion, by using bit rate efficiently, to increase the compressed image quality.

According to a preferred embodiment, the video encoding method of the present invention distributes the bit rate to a target macroblock in a digital image. The digital image comprises a plurality of macroblocks, and each macroblock performs the further video image encoding according to the distributed bit rate. First, choose a comparison area in the digital image according to the location of the target macroblock in the digital image. The comparison area includes a plurality of macroblocks that have already been distributed the corresponding bit rates. Then, choose a similar macroblock from the macroblocks of the chosen comparison area according to a Similar Macroblock Choosing (SMC) procedure. Then, calculate respectively a first video distortion variable and a second video distortion variable according to a Video Distortion Calculation (VDC) process, wherein the first video distortion variable represents the average degree of distortion of the plural macroblocks in the comparison area, and the second video distortion variable represents the degree of distortion of the chosen similar marcoblock. Finally, determine the bit rate of the target macroblock according to the distributed bit rate of the similar macroblock and the difference between the first and the second video distortion variables.

By calculating the distributed bit rate of every macroblock according to the present invention, the present invention can distribute the bit rate efficiently, and precisely distribute the bit budget in every macroblock. After decompressing the digital image, the digital image can get better image effect.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
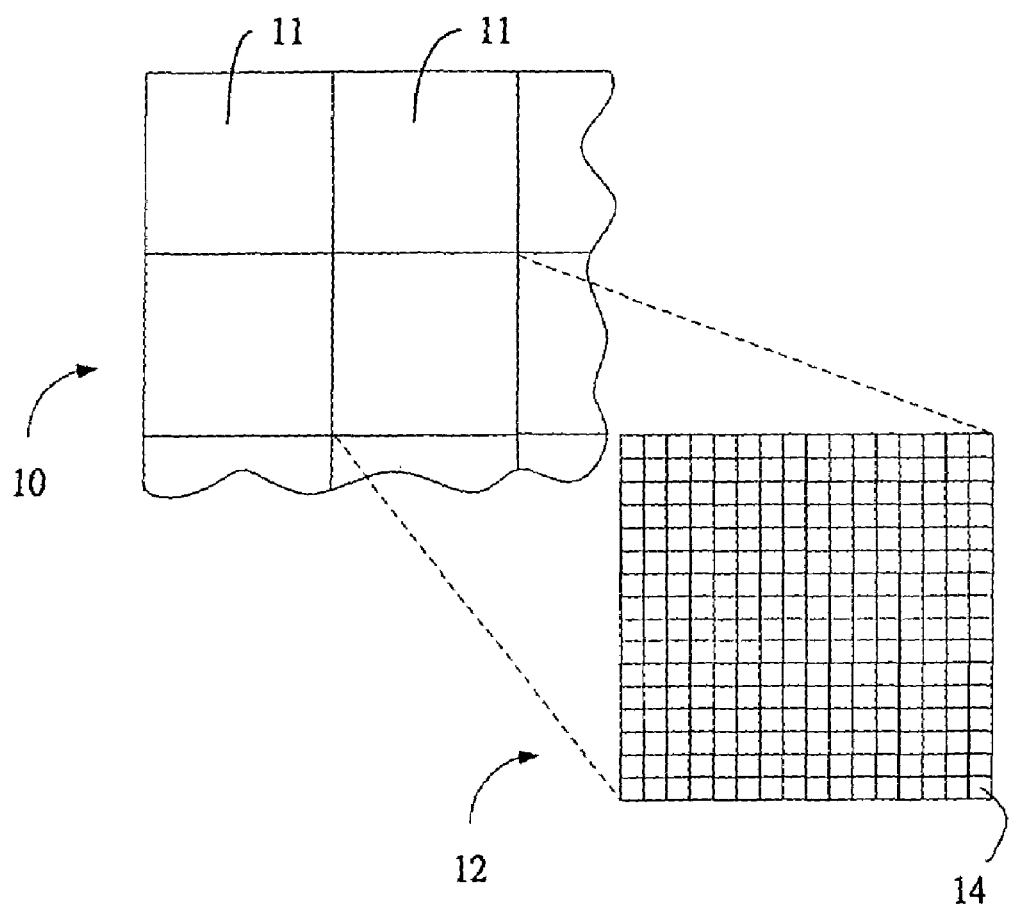
FIG. 1 is a schematic diagram of the digital image of the video encoding method and system according to the present invention.

Please refer to FIG. 1. FIG. 1 is a schematic diagram of the digital image 10 of the video encoding method and system according to the present invention. The digital image 10 comprises a plurality of macroblocks 11. Each macroblock 11 is a square and has 16 pixels 14 in the length and in the width, so each macroblock has 256 pixels 14. Each pixel 14 has an original gray level. The video image encoding method according to the present invention is for distributing a bit rate to a macroblock 11 in a digital image 10 while performing the video image encoding. Each macroblock 11 performs further the video image encoding according to the distributed bit rate. The following illustration showing the video encoding method of the present invention is for a macroblock in the digital image 10 to describe. Here we call a target macroblock 12.

Figure 2:
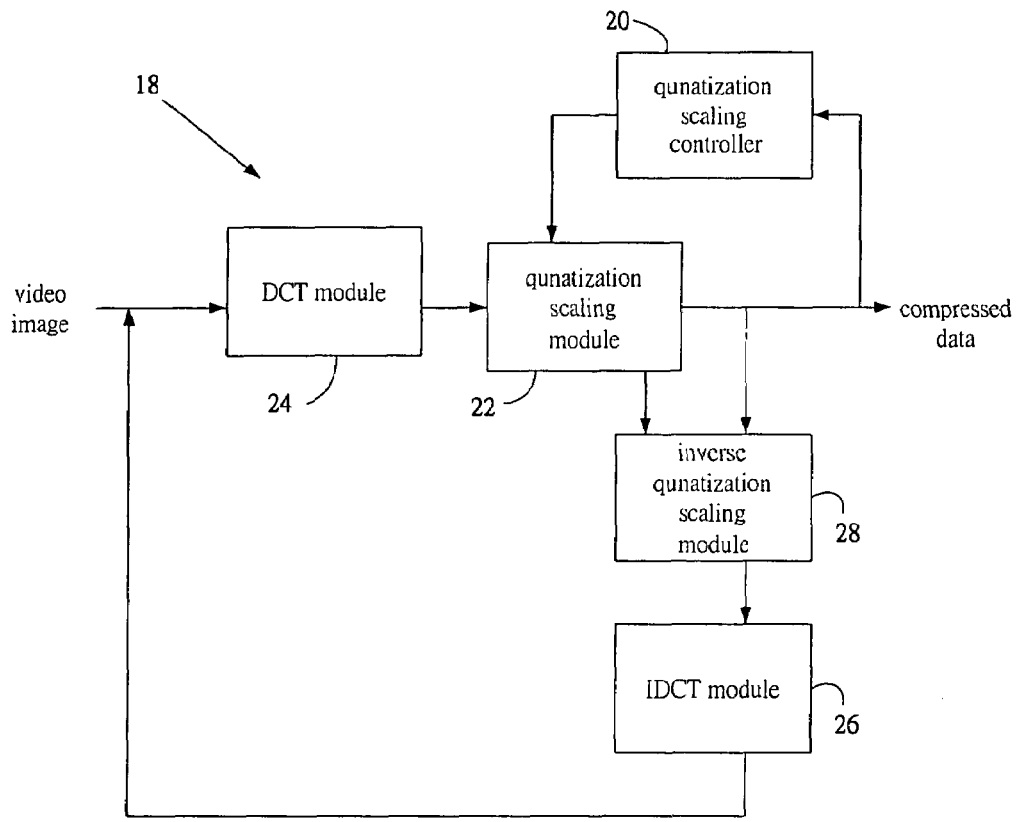
FIG. 2 is a function block diagram of the video encoding system according to the present invention.

Please refer to FIG. 2. FIG. 2 is a function block diagram of the video encoding system 18 according to the present invention. The encoding system 18 according to the present invention comprises a Discrete Cosine Transform (DCT) module 24, a qunatization scaling module 22, a qunatization scaling controller 20, an Inverse Discrete Cosine Transform (IDCT) module 26, and an inverse qunatization scaling module 28.

The DCT module 24 is for processing a DCT procedure on each macroblock, and then each macroblock becomes a DC format. The DC format is to display an image data in a frequency domain. The quantization scaling module 22 scales down the obtained values by a predetermined quantization scale and to reduce the associated bit rate, for further generating a corresponding MPEG compressed video image. The quantization scaling controller 20 changes the predetermined quantization scale. The inverse quantization scaling module 28 inverses the process of the quantization scaling module 22. The IDCT module 26 performs an IDCT procedure on the compressed video image so as to reconstruct a corresponding reconstruction macroblock. The reconstruction macroblock includes the same numbers of pixels 14 as the original (before compressed) macroblock does, and each pixel 14 in the reconstruction macroblock has a corresponding reconstruction gray level.

Figure 3:
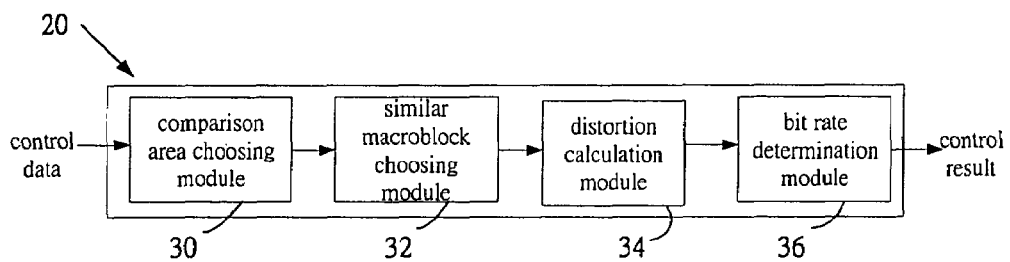
FIG. 3 is a function block diagram of the quantization scaling controller shown in FIG. 2.

Please refer to FIG. 3. FIG. 3 is a function block diagram of the quantization scaling controller 20 shown in FIG. 2. The quantization scaling controller 20 according to the present invention comprises a comparison area choosing module 30, a similar macroblock choosing module 32, a distortion calculation module 34, and a bit rate determination module 36. The comparison area choosing module 30 is used for choosing a comparison area 16 according to the location of the target macroblock 12 in the digital image 10. The similar macroblock choosing module 32 is used for choosing a similar macroblock from the macroblocks 11 of the chosen comparison area 16. The distortion calculation module 34 is used for calculating respectively a first video distortion variable R_avg and a second video distortion variable R_sml. The bit rate determination module 36 is used for determining the bit rate of the target macroblock 12.

Figure 4:
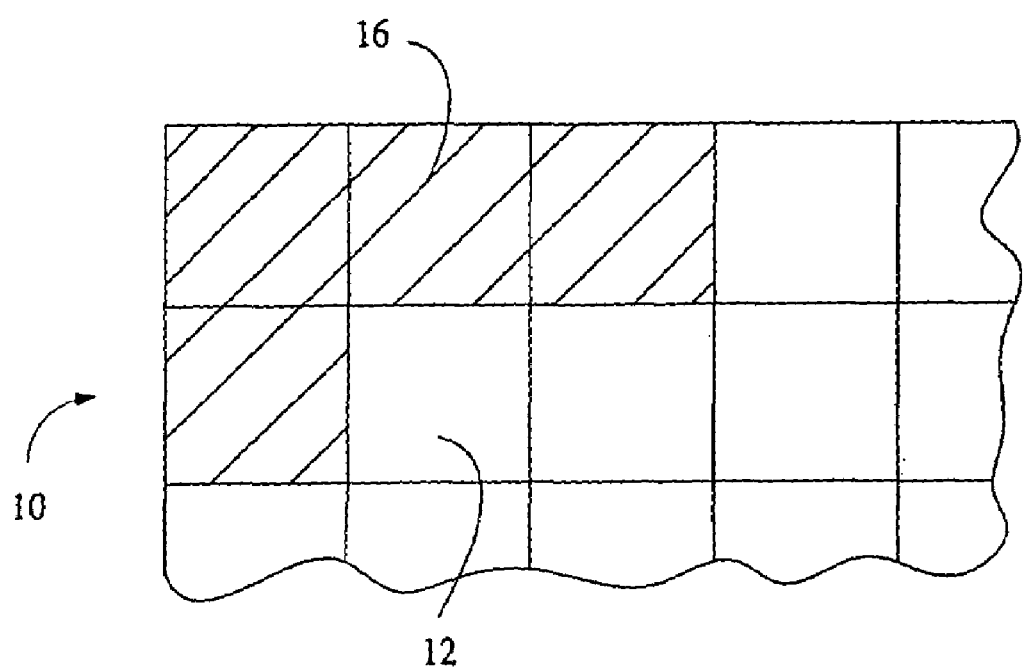
FIG. 4 is a schematic diagram of choosing a comparison area according to the target macroblock shown in FIG. 1.

Please refer to FIG. 4. FIG. 4 is a schematic diagram of choosing a comparison area 16 according to the target macroblock 12 shown in FIG. 1. The comparison area chosen process according to the present invention is that the comparison area choosing module 30 basing the center on the target macroblock 12 defines the plurality of adjacent macroblocks, which have already been distributed the corresponding bit rates, as the comparison area 16. So the comparison area 16 comprises a plurality of macroblocks 11 that have already been distributed the corresponding bit rates. The area marked by the oblique lines in FIG. 4 is the comparison area 16.

Figure 5:
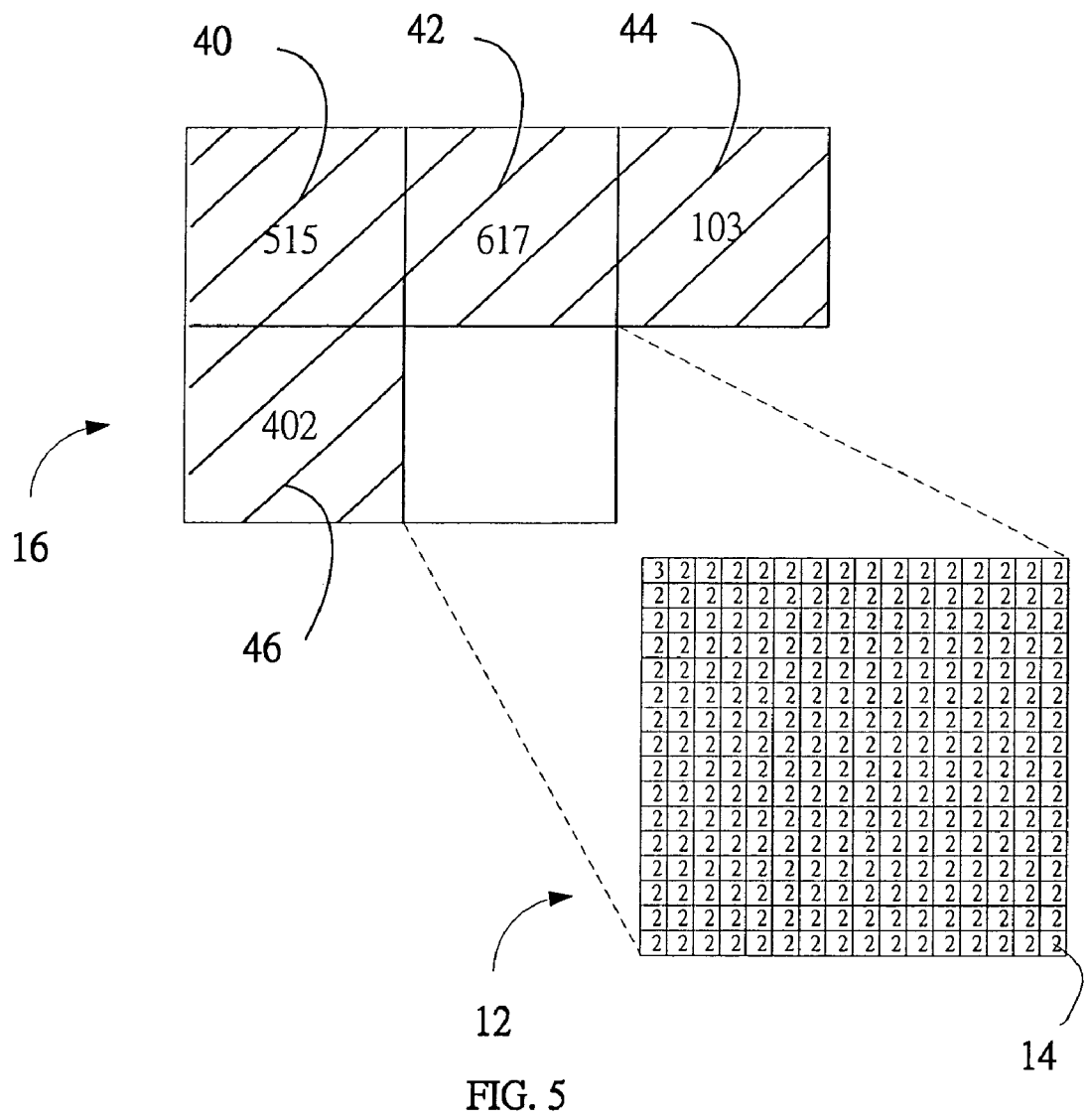
FIG. 5 is a schematic diagram of choosing a similar macroblock from the comparison area shown in FIG. 4.

Please refer to FIG. 5. FIG. 5 is a schematic diagram of choosing a similar macroblock from the comparison area 16 shown in FIG. 4. The present invention has a Similar Macroblock Choosing (SMC) procedure. First, the similar macroblock choosing module 32 calculates the total sum of the original gray levels of all the pixels 14 within the target macroblock 12. Because the gray level that the target macroblock 12 has 255 pixels 14 is 2, only one gray level of the pixel 14 is 3, the total and the target original gray level are all 513. Then, the similar macroblock choosing module 32 respectively calculates the total sum of the original gray levels of all the pixels 14 of macroblock 40, 42, 44 and 46 in the comparison area 16 to generate the comparison original gray levels 515, 617, 103, and 402 respectively. Then, the similar macroblock choosing module 32 respectively compares the comparison original gray levels with the target original gray level to pick out the macroblock with the smallest difference as the macroblock 40, so the similar macroblock choosing module 32 defines the macroblock 40 as the similar macroblock of the target macroblock 12.

The video distortion variable calculation method of the macroblock in the present invention can be a different one. For example, calculate the Sum of Absolute Difference (SAD), the Mean Square Error (MSE), and the Peak Signal to Noise Ratio (PSNR). If the macroblock has n pixels, i=1~n, and Oi and Ri are respectively the original gray level and the reconstruction gray level of the i-th pixel 14, then the equations of three method are:

$$SAD = \sum_{i=1}^{n} |O_i - R_i|$$

$$MSE = \sum_{i=1}^{n} |O_i - R_i|^2 / n$$

$$PSNR = 20 * \log_{10}(255/\sqrt{MSE})$$

The calculation method of the first video distortion variable R_avg is performed a distortion calculating process by the distortion calculation module 34. Add and average the macroblock 40, 42, 44, and 46 in the comparison area 16 corresponding to the video distortion variable. The first video distortion variable R_avg means the average degree of distortion in the comparison area 16. The second video distortion variable R_sml is the similar macroblock video distortion variable corresponding to the target macroblock 12.

If the bit rate distributed to the target macroblock 12 is defined as T_tar, the T_tar can be calculated by the bit rate distributed to the next macroblock 12 with the following formula:

$$T\_tar = T\_sml + k*(R\_avg - R\_sml)$$

Wherein T_sml is the bit rate of the similar macroblock distributed formerly. K is an adjustable weight. The adjustable weight k is the experience value by the experiment, and proportional to the bit rate.

The method of determining the target macroblock 12 the distributed bit rate according to the present invention is performed a bit rate determining process by the bit rate determination module 36. The distributed bit rate T_sml of the similar macroblock adds up the difference between the first video distortion variable R_avg and the second video distortion variable R_sml. The sum is multiplied by the adjustable weight k to determine the bit rate of the target macroblock 12.

Figure 6:
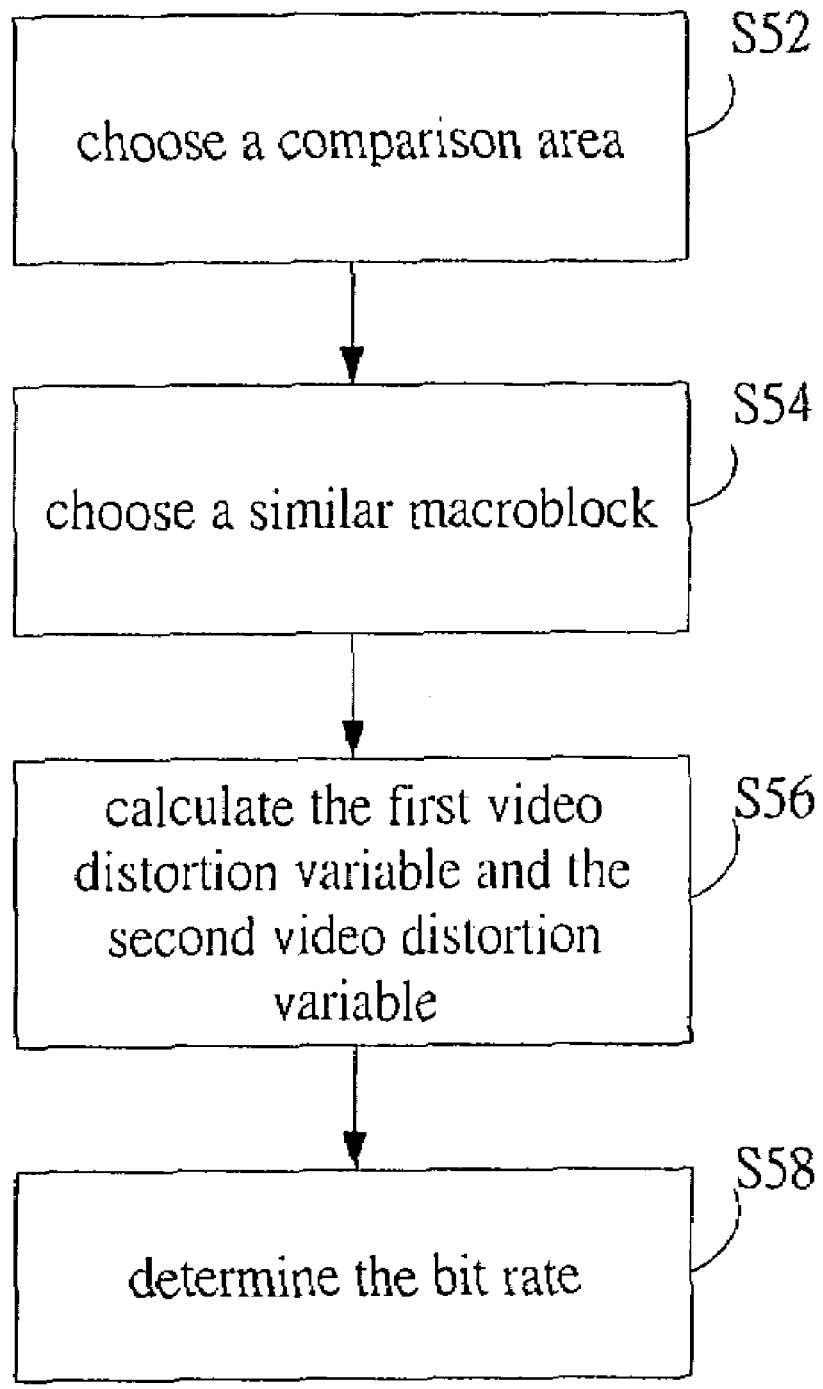
FIG. 6 is a flow chart of the video encoding method according to the present invention.

Please refer to FIG. 6. FIG. 6 is a flow chart of the video encoding method according to the present invention. By the video encoding method according to the present invention, when distributing the video image encoding bit rate of the target macroblock 12 in the digital image 10, comprise the following steps:

Step S52: choosing a comparison area 16 in the digital image 10 according to the location of the target macroblock 12.

Step S54: choosing a similar macroblock from the comparison area 16 according to the SMC procedure.

Step S56: calculating respectively the first video distortion variable R_avg and the second video distortion variable R_sml according to the VDC process.

Step S58: determining the bit rate of the target macroblock 12 by the formulas according to the distributed bit rate T_sml of the similar macroblock, the first video distortion variable R_avg, the second video distortion variable R_sml and the adjustable weight k.

Therefore, according to the distributed bit rate of every macroblock calculated by the present invention, can distribute the bit rate efficiently. Comparing with the prior art of using the fix bit rate, the bit rate distributing method according to the present invention can get a better digital image effect after decompressing the digital image 10. Besides, comparing with another prior art of using a complex of macroblocks, the present invention can more correctly distribute the bit budget.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A video image encoding method, for distributing a bit rate to a target macroblock in a digital image while performing video image encoding, the digital image comprising a plurality of macroblocks, each macroblock performing further video image encoding according to the distributed bit rate, the video image encoding method comprising the following steps:

choosing a comparison area in the digital image according to the location of the target macroblock in the digital image, the comparison area including a plurality of macroblocks that have already been distributed the corresponding bit rates;

choosing a similar macroblock from the macroblocks of the chosen comparison area according to a Similar Macroblock Choosing(SMC) procedure;

calculating respectively a first video distortion variable and a second video distortion variable according to a Video Distortion Calculation(VDC) process, wherein the first video distortion variable represents the average degree of distortion of the plural macroblocks in the comparison area, and the second video distortion variable represents the degree of distortion of the chosen similar marcoblock; and determining the bit rate of the target macroblock according to the distributed bit rate of the similar macroblock and the difference between the first and the second video distortion variables.

2. The encoding method of claim 1, wherein the comparison area is chosen by the following steps:

basing the center on the target macroblock, and defining the comparison area to include the adjacent macroblocks that have already been distributed the corresponding bit rates.

3. The encoding method of claim 1, wherein the method sequentially encodes a plurality of transmitted digital image, and each macroblock in the digital image includes a plurality of pixels, and each pixel has respectively an original gray level.

4. The encoding method of claim 3, wherein all the macroblocks are of the same square shape, and each macroblock has respectively 16 pixels in the length and in the width.

5. The encoding method of claim 3, wherein the SMC procedure comprises the following steps:

calculating the total sum of the original gray levels of all the pixels within the target macroblock to generate a target original gray level;

calculating respectively the total sum of the original gray levels of all the pixels of each macroblock in the comparison area to generate respectively a plurality of comparison original gray levels corresponding to each macroblock in the comparison area; and comparing respectively the comparison original gray levels with the target original gray level to pick out the macroblock with the smallest difference as the similar macroblock.

6. The encoding method of claim 3, wherein each of the macroblocks is first processed via Discrete Cosine Transform (DCT) procedure, and is then to scale down the obtained values by a predetermined quantization scale and to reduce the associated bit rate, for further generating a corresponding MPEG compressed video image.

7. The encoding method of claim 6, wherein after Inverse Discrete Cosine Transform (IDCT) procedure, the compressed video image is reconstructed to be a corresponding reconstruction macroblock including the same numbers of pixels as the original macroblock does, and each pixel in the reconstruction macroblock has a corresponding reconstruction gray level.

8. The encoding method of claim 7, wherein the macroblock comprises n pixels, the original gray level of the i-th pixel is Oi (i=1~n), the reconstruction gray level of the i-th pixel is Ri, and the VDC process calculates a video distortion variable SAD of a macroblock by the following step:

$$SAD = \sum_{i=1}^{n} |O_i - R_i|.$$

9. The encoding method of claim 7, wherein the macroblock comprises n pixels, the original gray level of the i-th pixel is Oi(i=1~n), the reconstruction gray level of the i-th pixel is Ri, and the VDC process calculates a video distortion variable MSE of a macroblock by the following step:

$$MSE = \sum_{i=1}^{n} |O_i - R_i|^2 / n.$$

10. The encoding method of claim 7, wherein the macroblock comprises n pixels, the original gray level of the i-th pixel is Oi(i=1~n), the reconstruction gray level of the i-th pixel is Ri, and the VDC process calculates a video distortion variable PSNR of a macroblock by the following step:

$$PSNR = 20 * \log_{10}(255/\sqrt{MSE}).$$

11. The encoding method of claim 1, wherein the first video distortion variable is obtained by averaging the calculation results of each of the macroblocks in the comparison area according to the SMC procedure, and the second video distortion variable is obtained by calculating the similar macroblock according to the SMC procedure.

12. The encoding method of claim 11, wherein the formerly distributed bit rate of the similar macroblock is defined as T_sml, the first video distortion variable is defined as R_avg, the second video distortion variable is defined as R_sml, and the bit rate to be distributed to the target macroblock is defined as T_tar that is calculated by the following formula:

$$T\_tar = T\_sml + k*(R\_avg - R\_sml);$$

wherein k is an adjustable weight.

13. A video image encoding system, for distributing a bit rate to a target macroblock in a digital image while performing video image encoding, the digital image comprising a plurality of macroblocks, each macroblock performing further video image encoding according to the distributed bit rate, the video image encoding system comprising:

a comparison area choosing module, for choosing a comparison area in the digital image according to the location of the target macroblock in the digital image, the comparison area including a plurality of macroblocks that have already been distributed the corresponding bit rates;

a similar macroblock choosing module, for choosing a similar macroblock from the macroblocks of the chosen comparison area according to a Similar Macroblock Choosing(SMC) procedure;

a distortion calculation module, for calculating respectively a first video distortion variable and a second video distortion variable, wherein the first video distortion variable represents the average degree of distortion of the plural macroblocks in the comparison area, and the second video distortion variable represents the degree of distortion of the chosen similar marcoblock; and a bit rate determination module, for determining the bit rate of the target macroblock according to the distributed bit rate of the similar macroblock and the difference between the first and the second video distortion variables.

14. The encoding system of claim 13, wherein the comparison area is chosen by the comparison area choosing module basing the center on the target macroblock, and is defined as to include the adjacent macroblocks that have already been distributed the corresponding bit rates.

15. The encoding system of claim 13, wherein the system sequentially encodes a plurality of transmitted digital image, and each macroblock in the digital image includes a plurality of pixels, and each pixel has respectively an original gray level.

16. The encoding system of claim 15, wherein the encoding system further comprises:
   a Discrete Cosine Transform (DCT) module, for processing DCT procedure on each of the macroblocks, and
   a quantization scaling module, for scaling down the obtained DCT values by a predetermined quantization scale and to reduce the associated bit rate, for further generating a corresponding MPEG compressed video image.

17. The encoding system of claim 16, wherein the encoding system comprises a quantization scaling controller, comprising the comparison area choosing module, the similar macroblock choosing module, the distortion calculation module and the bit rate determination module, the quantization scaling controller further modifying the predetermined quantization scale according to the distributed bit rate of the target macroblock, the totally used bit rates of the macroblocks that have already been distributed the corresponding bit rates in the digital image, and originally total budget bit rates of the digital image.

18. The encoding system of claim 16, wherein the encoding system further comprises:
   an Inverse Discrete Cosine Transform (IDCT) module, for performing an IDCT procedure on the compressed video image so as to reconstruct a corresponding reconstruction macroblock;
   wherein the reconstruction macroblock includes the same numbers of pixels as the original macroblock does, and each pixel in the reconstruction macroblock has a corresponding reconstruction gray level.

19. The encoding system of claim 13, wherein the first video distortion variable is obtained by averaging the calculation results of each of the macroblocks in the comparison area according to the SMC module, and the second video distortion variable is obtained by calculating the similar macroblock according to the SMC module.

* * * * *